United States Patent [19]

Ball et al.

[11] Patent Number: 4,676,524

[45] Date of Patent: Jun. 30, 1987

[54] MOTOR VEHICLE WITH AN OPEN BODY

[76] Inventors: Wilfried Ball, Dingolfing; Heinz Stelzer, Oberschleissheim; Fritz Ritzl, Planegg; Hermann Siebold, Munich; Peter Hens, Pfaffenhofen/Ilm; Edmund Hautmann, Fischbachau, all of Fed. Rep. of German

[73] Assignee: Baxerische Motoren Werke AG, Fed. Rep. of Germany

[21] Appl. No.: 821,955

[22] Filed: Jan. 24, 1986

[30] Foreign Application Priority Data

Jan. 26, 1985 [DE] Fed. Rep. of Germany ....... 3502574

[51] Int. Cl.$^4$ ............................................. B60R 21/02
[52] U.S. Cl. .................................... 280/75.6; 296/146; 296/186; 296/188

[58] Field of Search ............. 280/748, 756; 297/84 A, 297/146, 186, 188, 201

[56] References Cited

U.S. PATENT DOCUMENTS 3,198,572 8/1965 Stolarczyk ........................... 296/201
3,622,177 11/1971 Notestine et al. .................... 280/756

FOREIGN PATENT DOCUMENTS 8406461 8/1984 Fed. Rep. of Germany .
2512752 3/1983 France .................................. 296/201

Primary Examiner—John J. Love
Assistant Examiner—Kenneth R. Rice
Attorney, Agent, or Firm—Barnes and Thornburg

[57] ABSTRACT

A motor vehicle with an open body which includes forward body columns inclined opposite the driving direction. These body columns are protected against buckling in case of an overturning of the vehicle by approximately vertically extending support struts.

10 Claims, 3 Drawing Figures

MOTOR VEHICLE WITH AN OPEN BODY

The present invention relates to a motor vehicle with an open body, such as a convertible, having forward body columns, which are inclined opposite the driving direction and receive a windshield, and with forward side doors.

The passengers of such a motor vehcile are more endangered in case of an accident than with a closed motor vehicle. In particular when the motor vehicle turns over, a protecting roof is missing. In case of such a turnover, the motor vehicle rolls off along the rear area and the top edge of the windshield frame. A free space remains, by means of which at least the forward passenger is protected to a certain extent. Of course, this is true only if he has fastened the safety belt and as a result thereof is not thrown out of the vehicle during the accident.

If, however, the forward body columns buckle during the overturning, then this free space is reduced with the consequence of an increased endangering of the vehicle passengers.

It is the object of the present invention to so further develop a motor vehicle of the aforementioned type that the danger of the collapsing, respectively, of the buckling of the forward body columns, is reduced.

The underlying problems are solved according to the present invention by means of an approximately vertically extending support strut which is arranged between the upper end of each body column and the railing of the respective vehicle door.

The support strut absorbs the forces which act on the body columns, respectively, on the cross connection thereof in case the vehicle turns over. The support strut further conducts the forces into the vehicle door and therewith into the vehicle body. In an appropriate construction of the present invention, the support strut extends down to the bottom edge of the vehicle door. As a result thereof, it conducts the absorbed forces in a predetermined manner to the customary body threshold beam.

With such a construction, it is inherently necessary that the support strut be connected with the vehicle door. However, also in all other cases this is appropriate by reason of a simple construction resulting therefrom. However, with such a construction, conditions may occur in which the support strut is bent toward the outside or inside by the introduced forces so that it is able to fulfill its function to prevent the buckling or collapsing of the body columns, only partially or not at all. In one advantageous construction of the present invention, the support strut is therefore in operative engagement with the upper end of the body column when the vehicle door is closed.

Such an engaging connection may be in the form of a spring-loaded locking bolt which, during the closing of the door, engages in a corresponding counter-piece of the body column. During the opening of the door, the locking bolt can be retracted by way of the door opening handle.

A further engaging connection of simple construction in accordance with the present invention provides at the support strut a mushroom-shaped catch-hook which protrudes through the opening of a counter-support of the vehicle column that is deformable in case of a force interaction. Owing to the particular construction and design, the door can be opened without any further measures. However, in case of an accident, the counter-support is deformed and thereby anchors the counter-hook. This construction therebeyond offers the advantage of effectively precluding an "escape" of the support strut in the vehicle longitudinal direction.

These and other objects, features and advantages of the present invention will become more apparent from the following description when taken in connection with the accompanying drawing which shows, for purposes of illustration only, two embodiments in accordance with the present invention, and wherein.

Figure 1:
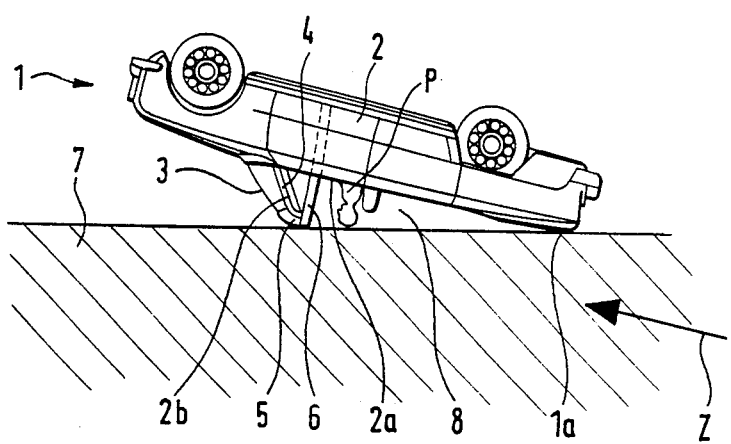
FIG. 1 is a somewhat schematic side view of a motor vehicle after or during an accident.

Referring now to the drawing wherein like reference numerals are used throughout the various views to designate like parts, the motor vehicle generally designated by reference numeral 1 which, according to FIG. 1, stands on its head, i.e., has already turned over, has an open body construction with forward side doors 2. A windshield 3 is inclined rearwardly opposite the driving direction and is retained laterally by forward body columns 4 which are inclined in the same manner as the windshield 3. A cross frame 5 connects the upper ends of the body columns 4, of which only one can be recognized by reason of the manner of illustration. The cross frame 5 serves at the same time as the upper windshield frame. An approximately vertically extending support strut 6 is arranged between the railing 2a and the upper end of the body column 4. The support strut 6 projects into the side door 2 and extends down to the lower edge thereof. Additionally, it is rigidly connected with the side door 2, i.e., partakes in the opening and closing movements thereof.

The motor vehicle 1 is supported in the illustrated position on the ground 7, on the one hand, within its rear area 1a and, on the other, by way of the cross frame 7. A free space 8 results therefrom which protects a vehicle passenger P.

The support strut 6 prevents that the upper body columns 4 buckle in the direction of the vehicle railing owing to the weight of the motor vehicle 1 and the impact thereof on the ground and therewith reduce the free space 8. The support strut 6 forms thereby a rigid connection together with a frame section 2b of the side door 2 abutting at the vehicle column 4. Owing to the fact that this frame section 2b abuts at the body column 4 with a closed door, a buckling of the support strut 6 into the vehicle interior is far-reachingly prevented thereby.

Figure 2:
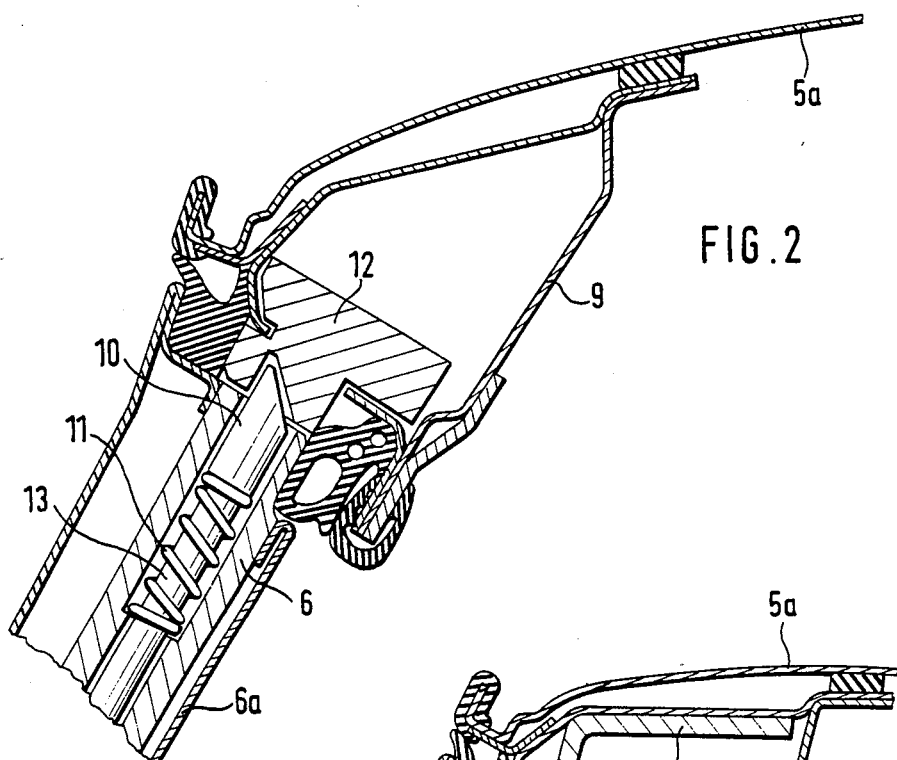
FIG. 2 is a partial cross-sectional view illustrating the locking of the support strut by means of a locking bolt.

In order to prevent also a buckling of the support strut 6 toward the outside, it is locked according to FIG. 2. FIG. 2 is a cross-sectional view in the direction of arrow Z. One can recognize in FIG. 2 the extension of a roof frame 9 which is constructed as continuation of the body column 4. A roof panel 5a represents symbolically the cross frame 5. The support strut 6 has in this case the shape of a tubular member and is surrounded with a covering 6a. In its interior, the support strut 6 accommodates a locking bolt 10 which a compression spring 11 presses upwardly into a counterpart 12 secured at the roof frame 9. The locking bolt 10 can be pulled downwardly by way of a Bowden cable 13 which is connected with the door opening handle (not shown).

FIG. 2 illustrates the condition with a closed door. If a force acts on the body column, respectively, the extension of the roof bearer 9 from above, then the support strut 6 cannot deflect outwardly by reason of the locking bolt 10.

Figure 3:
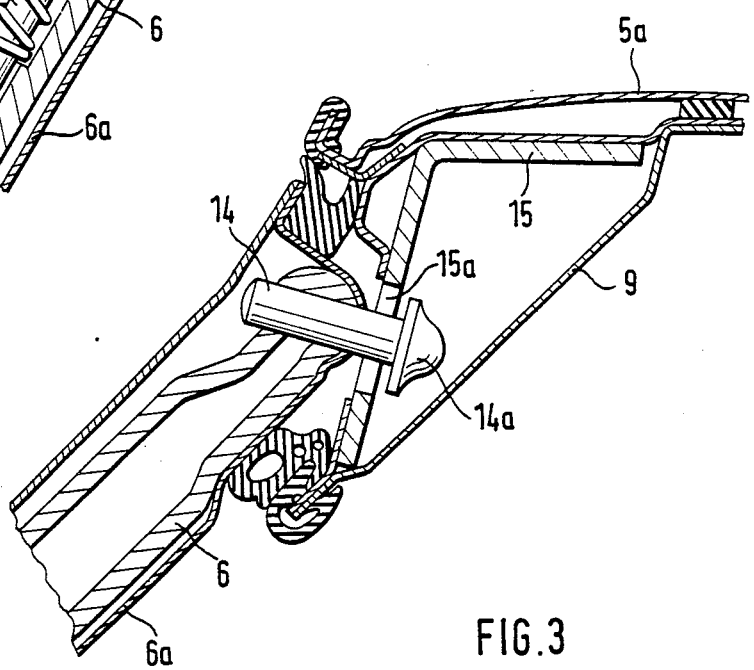
FIG. 3 is a partial cross-sectional view illustrating the locking of the support strut by way of a catch-hook.

A different type of locking arrangement is illustrated in FIG. 3 which again represents a view in the direction of arrow Z in FIG. 1. Also in this embodiment a tubular member forms the support strut 6, however, a mushroom-shaped catch-hook 14 is secured at its upper end. FIG. 3 illustrates also the condition with a closed door. The catch-hook 14 projects with its mushroom-shaped head 14a through an opening 15a of a counter-support 15 which is secured at the roof frame 9. The opening 15a is thereby larger than the diameter of the head 14a. The catch-hook 14 can thereby be moved without difficulty through the opening 15a during the opening and closing of the door. If, however, in case of a crash a force acts from above on the roof frame, then the counter-support 15 is deformed and therewith its opening 15a. The catch-hook 14 is thereby anchored in the counter-support 15 so that again a deflection of the support strut 17 toward the outside is prevented.

While we have shown and described only two embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. A motor vehicle having an open body construction, comprising forward body column means inclined opposite the driving direction, a windshield mounted in said body column means, side doors, and approximately vertically extending body column structural support strut means connected between the upper end of a respective body column means and the railing means of the vehicle door.

2. A motor vehicle according to claim 1, wherein the support strut means extends to the lower edge of the vehicle door.

3. A motor vehicle according to claim 2, wherein the support strut means is secured at the vehicle door and with a closed vehicle door is in engaging connection with the upper end of the column means.

4. A motor vehicle according to claim 3, further comprising a spring-loaded locking bolt means actuatable by means of a door opening handle and arranged within the support strut means, said locking bolt means is operable to engage in the body column means.

5. A motor vehicle according to claim 3, further comprising a mushroom-shaped catch hook means secured at the support strut means which projects through an opening of a counter-support means of the column means, said counter-support means being operable to be deformed in case of a force interaction.

6. A motor vehicle according to claim 1, wherein the support strut means is secured at the vehicle door and with a closed vehicle door is in engaging connection with the upper end of the column means.

7. A motor vehicle according to claim 6, further comprising a spring-loaded locking bolt means actuatable by means of a door opening handle and arranged within the support strut means, said locking bolt means is operable to engage in the body column means.

8. A motor vehicle according to claim 6, further comprising a mushroom-shaped catch hook means secured at the support strut means which projects through an opening of a counter-support means of the column means, said counter-support means being operable to be deformed in case of a force interaction.

9. A motor vehicle according to claim 1, further comprising a spring-loaded locking bolt means actuatable by means of a door opening handle and arranged within the support strut means, said locking bolt means is operable to engage in the body column means.

10. A motor vehicle according to claim 1, further comprising a mushroom-shaped catch hook means secured at the support strut means which projects through an opening of a counter-support means of the column means, said counter-support means being operable to be deformed in case of a force interaction.

* * * * *